Patented Nov. 7, 1933

1,934,657

UNITED STATES PATENT OFFICE 1,934,657

CARBOCYANINE DYES AND METHOD OF PREPARING THEM

Leslie G. S. Brooker, Rochester, N. Y., assignor to Eastman Kodak Company, Rochester, N. Y., a corporation of New York No Drawing. Application March 5, 1931
Serial No. 520,459

19 Claims. (Cl. 260—44)

This invention relates to a new composition of matter, and particularly to a new class of photographic sensitizing dyes, and a method for their preparation.

As ordinary photographic emulsions are generally indifferent to those colors of the spectrum of longer wave lengths, various types of sensitizing dyes have been suggested for incorporation in photographic emulsions, or for employing over emulsions as overcoatings so as to increase the spectral sensitiveness thereof. Many cyanine dyes have been described for this purpose containing the benzothiazole nucleus, whilst classes of these photo-sensitizing dyes containing the naphthothiazole nucleus are described in my co-pending applications of Serial No. 337,177 filed February 2, 1929; Nos. 435,104 and 435,105, filed March 12, 1930; and No. 437,017, filed March 19, 1930, whilst those containing the thiazoline nucleus are described in my co-pending application Serial No. 460,548 filed June 11, 1930 and those containing the thiazole nucleus are described in my co-pending application Ser. No. 548,026 filed June 30, 1931.

An object of the present invention is to provide a process for the preparation of photo-sensitizing dyes of the thiocarbocyanine series containing benzothiazole nuclei and having alkyl substituents with more than one carbon atom in the radical attached to the central carbon atom of the three-carbon chain.

A further object of this invention is to provide such photo-sensitizing dyes as may be added to photographic emulsions or coated thereon as an overcoating whereby the spectral sensitivity of the photographic emulsion is increased. Other objects will hereinafter appear.

I have found that dyes having good photosensitizing properties may be prepared by the treatment of a 1-methylbenzothiazole alkyl quaternary salt with an ortho-ester of an aliphatic carboxylic acid, the acid corresponding to which contains more than two carbon atoms in the molecule. The reaction may be carried out in boiling dry pyridine. The ortho-esters of the carboxylic acids which I have found particularly suitable include such esters as trimethyl ortho propionate, methyldiethyl ortho-n-caproate, methyldiethyl ortho-isocaproate, and trimethyl ortho-valerate.

The reaction of a 1-methylbenzothiazole alkyl quarternary salt with one of these ortho-esters of a carboxylic acid in the presence of pyridine may be written graphically as follows:

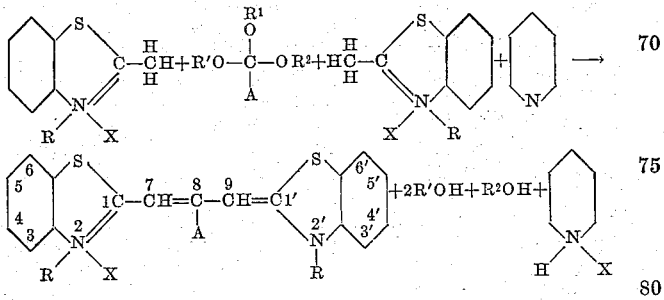

In the above structures R represents an alkyl group and X an acid radical. A stands for the alkyl group to be introduced into the three-carbon chain of the thiocarbocyanine dye and OR' and OR² represent the alkoxy groupings of the ortho-ester and these may be similar or dissimilar. The dye molecule is numbered as shown, so that a compound of this type may be described as a 2:2'-dialkyl-8-alkyl-thiocarbocyanine salt.

In the actual practice it is frequently desirable to carry out the condensation with an acid radical such as the p-toluenesulfonate, which confers a comparatively high degree of solubility on the 1-methylbenzothiazole alkyl quaternary salt and on the dye. The latter is then conveniently isolated as a less soluble salt by double-decomposition in the ordinary way, such salts as ammonium or potassium bromide or iodide being employed for this purpose, usually in aqueous solution.

The —CH= group is called the methenyl group and therefore the chain —CH=CH—CH= may be called a tri-methenyl chain, and the chain

may similarly be called a tri-methenyl chain in which the hydrogen attached to the central carbon atom has been replaced by the group denoted by the letter A.

The nomenclature and numbering of the above classes of compounds and intermediates are in accord with present usage and also the system used in my co-pending applications given above. The numbering, of course, is arbitrary and is given for the guidance of those skilled in the art in order that there be no question as to the identity of a compound covered by my invention.

The methods for the formation of the 1-methylbenzothiazoles (used in the preparation of the photographic sensitizing dyes herein described) are given in the literature. One general method consists of the conversion of the acetyl compound of an aromatic primary amine, such as p.toluidine, into the thio-acetyl compound by the action of phosphorous pentasulfide. This thio-acetyl compound is then dissolved in aqueous caustic alkali solution and oxidized with a cold aqueous solution of alkali ferricyanide whereupon the base is produced and may be extracted with ether.

The preparation of some of the ortho-esters of the aliphthatic carboxylic acids, the acids corresponding to which have more than two carbon atoms in the molecule have not, however, been described in the literature and I will give here, therefore, one method for their preparation. These ortho-esters are prepared by taking the nitrile of the corresponding acid as the starting material. The nitrile (one mol.) is dissolved in dry absolute ethyl ether together with an alcohol (1 mol.) such as methyl or ethyl alcohol, all of the reactants being as free from moisture as possible, and dry hydrochloric acid gas (rather more than 1 mol.) is led in, using good cooling throughout the operation. The imino-ether hydrochloride separates and the whole is kept cold until crystallization appears to be complete, when the crystals are filtered off, carefully washed with dry absolute ethyl ether and dried in a vacuum over solid caustic potash until free from all excess of hydrochloric acid. The dry imino-ether hydrochloride is then decomposed at room temperature with an alcohol, taking roughly 2 cc. of the alcohol, as free from moisture as possible, for every gram of the hydrochloride. The latter dissolves more or less completely and the formation of the ortho-ester is accompanied by the separation of ammonium chloride, the formation of which may be used as an indication of the course of the reaction.

The reaction vessel is tightly stoppered and allowed to stand for several days or even several weeks until the reaction is apparently complete. The insoluble material is then filtered off and the excess alcohol is removed by distillation, filtering again if necessary. The ester is finally distilled over, using diminished pressure as a rule, and is purified by refractionation. Thus propionitrile on treatment with methyl alcohol and hydrochloric acid gas in the manner described above yields propio-imino-methyl-ether hydrochloride, and this, when subjected to the action of methyl alcohol in the manner described, yields trimethyl ortho-propionate. Mixed esters may be made by taking two different alcohols for the two separate steps of the reaction. Thus n-capronitrile may be converted into n-capro-iminomethyl-ether hydrochloride by the joint action of methyl alcohol and hydrochloric acid gas and this on further treatment with ethyl alcohol yields methyldiethyl ortho-n-caproate as the principal product. The ortho-esters of other aliphatic carboxylic acids having more than two carbon atoms in the molecule may be prepared in a similar manner.

I will now give several examples for preparing various dyes referred to, but it will be understood that they are merely representative of a great number of reactions in which the proportions given and equivalents used may vary in accord with the particular type of dye required. My invention, therefore, will not be restricted thereby except as indicated in the appended claims.

The 1-methylbenzothiazole used in any of the described condensations may be unsubstituted in the benzene nucleus, or it may be substituted therein, as for example by a fused-on benzene nucleus, as described in my co-pending application Serial No. 435,104.

EXAMPLE 1

*2:2': 8-triethylthiocarbocyanine iodide*

6.1 g. (1 mol.) of 1-methylbenzothiazole ethiodide was refluxed for one hour with 5.4 g. (2 mols., 300% excess) trimethyl ortho-propionate and 30 cc. dry pyridine. The solution was well diluted with water and let stand for several days to crystallize out. Greenish-bronze crystals were obtained, weighing 0.6 g., which were crystallized from a mixture of acetone and methyl alcohol. Dark green prisms separated showing a bronze reflex and the solution was bluish-red.

A larger yield of the material was obtained as follows. 7 g. (1 mol.) of 1-methylbenzothiazole etho-p-toluene-sulfonate was boiled under reflux for one hour with 2.7 g. (1 mol.) trimethyl ortho-propionate and 7 cc. dry pyridine. A warm solution of 10 g. potassium iodide in 50 cc. water was added and the iodide of the dye was filtered off when cold and obtained as a dull greenish-black powder weighing 3.67 g. after washing with water and with cold acetone. This was crystallized from 50 cc. methyl alcohol using an extraction apparatus and on cooling the dye crystallized out in beautiful prisms, some faces of which reflected blue light and others green light.

If in place of the 1-methylbenzothiazole etho-p-toluene-sulfonate used above, one employs 6.7 g. (1 mol.) of 1-methylbenzothiazole metho-p-toluenesulfonate (made by condensing equimolecular proportions of 1-methylbenzothiazole and methyl-p-toluenesulfonate together overnight on the steam bath and crystallizing the crude salt from ethyl alcohol and drying it well) and refluxes it for an hour with 2.7 g. (1 mol.) of trimethyl ortho-propionate and 20 cc. pyridine, 2:2' dimethyl-8-ethylthiocarbocyanine p-toluenesulfonate will be produced. The dye may be isolated as the bromide by precipitating it with an excess of an aqueous solution of ammonium bromide and weighed 2.9 g. when dry. The dye crystallizes from methyl alcohol in purplish-brown needles with a green reflex, and gives a bluish-red solution in this solvent.

EXAMPLE 2

*8-ethyl-2: 2'-diallylthiocarbocyanine iodide*

12.7 g. (1 mol.) of 1-methylbenzothiazole al-liodide (made by condensing the base with an equivalent amount of allyl iodide and purifying the product by recrystallizing it) was refluxed for forty-five minutes with 10.8 g. (2 mols.) trimethyl ortho-propionate and 40 cc. of pyridine. A solution of 10 g. of potassium iodide in 200 cc. of water was added and the mixture cooled in ice water and stirred with ether to induce crystallization. The dye was filtered off, washed alternately with water and with acetone and dried. A dull purplish-brown powder weighing 1.67 g. was obtained. The dye was obtained (free from a less soluble by-product) as dark greenish crystals with a pale bronze reflex.

Example 3

5:5'-dimethyl-2:2':8-triethylthiocarbocyanine iodide 4.1 g. (1 mol.) 1:5-dimethylbenzothiazole was heated overnight in an oil bath at 140–150° C. with 5.5 g. (1.1 mol.) ethyl p-toluene-sulfonate. The crude quaternary salt was then refluxed for forty-five minutes with 4.4 g. (1 mol.) triethyl ortho-propionate and 20 cc. dry pyridine. A solution of 20 g. potassium iodide in 100 cc. hot water was used to precipitate the dye as the iodide, and after the mixture had cooled, the dye was filtered off and washed, and 3.4 g. of a dark green crystalline powder was obtained on drying. The dye was crystallized from methyl alcohol, dark green crystals being obtained which gave a bluish-red solution in this solvent.

Example 4

2:2'-dimethyl-8-n-butylthiocarbocyanine iodide 6.7 g. (1 mol.) of 1-methylbenzothiazole metho-p-toluene-sulfonate was refluxed with 6.5 g. (2 mols.) trimethyl ortho-n-valerate (obtained from n-valeronitrile) and 15 cc. dry pyridine for forty minutes. The dye was precipitated as the iodide using 10 g. of potassium iodide dissolved in 50 cc. of hot water, when a felted mass of crystals was obtained which weighed 3.1 g. after filtering, washing and drying. When recrystallized from methyl alcohol the dye formed dark purplish needles with a greenish-blue reflex. The solution of the dye in methyl alcohol was bluish-red.

Example 5

2:2'-dethyl-8-n-butylthiocarbocyanine iodide 7.0 g. (1 mol.) 1-methylbenzothiazole etho-p-toluene-sulfonate was refluxed with 6.5 g. (2 mols.) of trimethyl ortho-n-valerate and 20 cc. dry pyridine for forty minutes. The dye was precipitated as the iodide using a solution of 20 g. potassium iodide in 100 cc. hot water, when rapid crystallization occurred. The dye weighed 3.8 g. after filtering, washing and drying, and when recrystallized from methyl alcohol formed beautiful greenish-gray crystals with a marcasite-like lustre, which gave a bluish-red solution in the solvent.

Example 6

2:2'-dimethyl-8-n-amylthiocarbocyanine iodide 6.7 g. (1 mol.) 1-methylbenzothiazole metho-p-toluene-sulfonate was refluxed for an hour with 8.2 g. (2 mols.) of methyl-diethyl ortho-n-caproate (obtained from n-capronitrile) and 30 cc. dry pyridine. The dye was then precipitated as the iodide using a solution of 10 g. potassium iodide in 50 cc. hot water for this purpose. The product crystallized on cooling and was filtered off, washed, and dried. Weight 3.4 g. Reddish needles with a brilliant blue reflex were obtained on recrystallizing the dye from methyl alcohol, the solution being bluish-red.

Example 7

2:2'-diethyl-8-n-amylthiocarbocyanine iodide 7.0 g. (1 mol.) 1-methylbenzothiazole etho-p-toluene-sulfonate was refluxed for about an hour with 8.2 g. (2 mols.) methyldiethyl ortho-n-caproate and 15 cc. dry pyridine. The reaction mixture was then treated with a solution of 10 g. potassium iodide dissolved in 50 cc. of hot water and the whole allowed to stand overnight. The product, when filtered, washed with water followed by acetone, and dried, weighed 3.5 g. The dye crystallized from methyl alcohol in greenish-bronze granular crystals and gave a bluish-red solution.

Example 8

2:2'-diethyl-8-n-amylthiocarbocyanine iodide 6.7 g. (1 mol.) 1-methylbenzothiazole metho-p-toluene-sulfonate was refluxed with 8.2 g. (2 mols.) methyldiethyl ortho-isocaproate (obtained from isocapronitrile) and 20 cc. pyridine for forty minutes. The dye was precipitated as the iodide, using a solution of 10 g. potassium iodide in 50 cc. hot water and weighed 1.8 g. when filtered off, washed, and dried. It crystallized from methyl alcohol in compact dark bluish-grey prisms with a green reflex, and gave a bluish-red solution in this solvent.

By substituting various alkyl groups having more than one carbon atom in the position in the structural formula of the dye occupied by the letter A, and various alkyl groups in the two positions occupied by the letter R, many sensitizing dyes may be obtained. The letter X indicates any suitable anion such, for example, as a halide, p-toluenesulfonate, alkylosulphate, nitrate, acetate, perchlorate, or, in fact, any salt forming anion that will not render the dye too sparingly soluble or deleteriously affect the photographic sensitizing properties of the dye.

It is apparent from a thorough consideration of the above description that any thiocarbocyanine dye prepared from a 1-methylbenzothiazole unsubstituted or substituted, in which the 8 position of the dye is substituted by an alkyl group containing more than one carbon atom, will come within the scope of this invention whatever may be the radicals occupying the other substitutable positions of the structure. Furthermore, it will also be apparent that the genus claimed hereinafter not only includes the foregoing but also includes any carbocyanine dye containing two of the five-membered rings

linked together by a tri-methenyl chain, the hydrogen attached to the central carbon atom of which is substituted by an alkyl group containing more than one carbon atom such as, for example, the 8-substituted thiocarbocyanines derived from mu-methylnaphtho-thiazole described in my application Serial No. 435,104, the 7-substituted thiazolinocarbocyanines derived from 2-methylthiazoline described in my application Serial No. 460,548 and the 7-substituted thiazolocarbocyanines derived from 2-methylthiazole described in my application Serial No. 548,026.

In the claims, by an ortho-ester of an aliphatic carboxylic acid is meant an ortho-ester of a carboxylic acid, the acid corresponding to which contains a simple, unsubstituted alkyl group directly attached to the carbon atom of the carboxyl group. Examples of such ortho esters have already been given.

While the principal use now known for these new chemical compounds is for sensitizing photographic emulsions it may well be that other uses therefor will be discovered from time to time and consequently it is not intended that the foregoing description of the sensitizing properties of these dyes shall in any way limit the scope of the claims appended hereto. The combination of the dyes with a photographic emulsion is claimed in my co-pending application Serial No. 505,982 filed December 31, 1930.

What I claim as my invention and desire to be secured by Letters Patent of the United States is:

1. A carbocyanine dye of the following structure

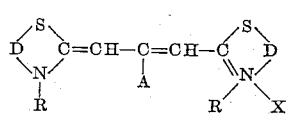

in which each D equals an ethylene, vinylene, phenylene or naphthylene group, R equals an alkyl radical, X equals an acid radical and A equals an alkyl radical containing more than one carbon atom.

2. A thiocarbocyanine dye of the following structure

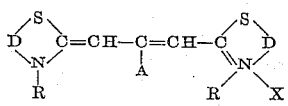

in which D equals a phenylene group, R equals an alkyl radical, X equals an acid radical and A equals an alkyl radical containing more than one carbon atom.

3. A thiocarbocyanine salt substituted in the 8 position with an alkyl radical containing more than one carbon atom.

4. A 2:2'-dialkyl-8-alkylthiocarbocyanine salt in which the 8-alkyl group contains more than one carbon atom.

5. A 5:5'-dimethyl-2:2'-8-triethylthiocarbocyanine salt.

6. A 2:2'-dimethyl-8-n-butylthiocarbocyanine salt.

7. A 2:2'-dimethyl - 8 - ethylthiocarbocyanine salt.

8. A 2:2'-dialkyl-8-alkylthiocarbocyanine halide in which the 8-alkyl group contains more than one carbon atom.

9. 5:5'-dimethyl-2:2' - 8 - triethylthiocarbocyanine iodide.

10. 2:2'-dimethyl-8-n - butylthiocarbocyanine iodide.

11. 2:2' - dimethyl - 8 - ethylthiocarbocyanine bromide.

12. The process of preparing carbocyanine dyes which comprises condensing, under the influence of heat, one molecular proportion of an ortho-ester of an aliphatic monocarboxylic acid, the acid corresponding to which contains more than two carbon atoms, with two molecular proportions of a compound having the structure

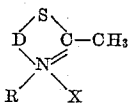

in which D equals an ethylene, vinylene, phenylene or naphthylene group, R equals an alkyl radical and X equals an acid radical.

13. The process of preparing carbocyanine dyes which comprises condensing, under the influence of heat, two molecular proportions of a non-methyl-benzothiazole quaternary salt with one molecular proportion of an ortho-ester of an aliphatic monobasic carboxylic acid, the acid corresponding to which contains more than two carbon atoms.

14. The process of preparing carbocyanine dyes which comprises condensing, under the influence of heat, a 1-methylbenzothiazole alkyl quaternary salt with a trialkyl ortho-ester of an aliphatic monobasic carboxylic acid, the acid corresponding to which contains more than two carbon atoms in the molecule.

15. The process of preparing carbocyanine dyes which comprises condensing, under the influence of heat, a 1-methylbenzothiazole alkyl quaternary salt with a trialkyl ortho-n-valerate.

16. The process of preparing carbocyanine dyes which comprises condensing, under the influence of heat, a 1-methylbenzothiazole alkyl quaternary salt with a trialkyl ortho-propionate.

17. The process of preparing carbocyanine dyes which comprises condensing, under the influence of heat, a 1-methylbenzothiazole alkyl-p-toluenesulfonate with a trialkyl ortho-ester of an aliphatic monobasic carboxylic acid, the acid corresponding to which contains more than two carbon atoms in the molecule.

18. The process of preparing carbocyanine dyes which comprises condensing, under the influence of heat, a 1-methylbenzothiazole alkyl-p-toluenesulfonate with a trialkyl ortho-n-valerate.

19. The process of preparing carbocyanine dyes which comprises condensing, under the influence of heat, a 1-methylbenzothiazole alkyl-p-toluene sulfonate with a trialkyl ortho-propionate.

LESLIE G. S. BROOKER.